H. ZOTTMAN.
SLAG-POT.
No. 187,212.
Patented Feb. 6, 1877.
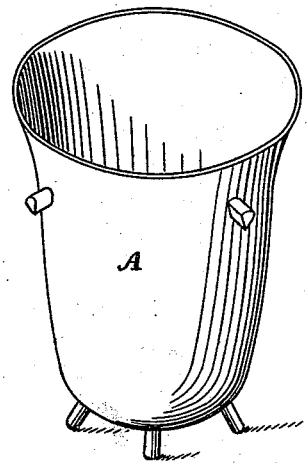
Witnesses
Geo. H. Strong.
Jno. L. Boone.
Inventor
Henry Zottman
by Dewey & Co.
Attys.

UNITED STATES PATENT OFFICE.

HENRY ZOTTMAN, OF EUREKA, NEVADA.

IMPROVEMENT IN SLAG-POTS.

Specification forming part of Letters Patent No. 187,212, dated February 6, 1877; application filed January 4, 1876.

*To all whom it may concern:*

Be it known that I, HENRY ZOTTMAN, of Eureka, Lander county, State of Nevada, have invented an Improved Slag-Pot; and I do hereby declare the following description and accompanying drawings are sufficient to enable any person skilled in the art or science to which it most nearly appertains to make and use my said invention or improvement without further invention or experiment.

The object of my invention is to provide a pot for containing slags which will not crack and break by reason of the unequal expansion and contraction of the metal of which it is made, occasioned by the sudden and unequal changes of temperature to which it is subjected.

My invention consists in manufacturing the pots of steel, and then subjecting them to an annealing or decarbonizing process, by which they are rendered sufficiently strong to resist the inequality of expansion caused by filling them with heated slag from the furnace.

Referring to the accompanying drawings, let A represent a slag-pot, which may be made in any desired shape or form.

In order to avoid the liability of cracking or breaking the pot by the unequal expansion and contraction of the metal of which it is made, when it is being filled with slag from the furnace, I make the pot of steel. The steel is first cut into small pieces and placed in crucibles. The crucibles are then placed in the furnace and heated by gas or coal until the metal or steel fuses, when it is poured into the dry molds. After cooling down, the pot is placed in a close oven and heated slowly until it becomes of a light red color, which heat is maintained for about forty-eight hours, when the heat is gradually lessened for twelve hours longer, when firing ceases entirely, and the oven is kept closed tightly until the pots are cool enough to handle, which is generally in one and a half days.

The durability of the pots will depend upon the perfection of the annealing or decarbonizing process.

Having thus described my invention, what I claim, and desire to secure by Letters Patent, is—

The method herein described for the manufacture of slag-pots, the same consisting of forming the pots out of melted steel cast in cold molds, then heating to a light red heat, and maintaining this heat for forty-eight hours, afterward gradually reducing the heat for twelve hours, when the firing ceases, and the pots are allowed to gradually cool in a tight oven, substantially as and for the purpose set forth.

HENRY ZOTTMAN.

Witnesses:
EDWARD F. WALSH,
CHRISTOPHER J. LANSING.